(12) United States Patent
Grant et al.

(10) Patent No.: US 8,939,502 B2
(45) Date of Patent: Jan. 27, 2015

(54) BLAST ATTENUATION SEAT

(75) Inventors: Neil Grant, Crysler (CA); Brent Almstedt, Ottawa (CA)

(73) Assignee: Med-Eng, LLC, Jacksonville, FL (US)

( * ) Notice: Subject to any disclaimer, the term of this patent is extended or adjusted under 35 U.S.C. 154(b) by 79 days.

(21) Appl. No.: 13/701,186

(22) PCT Filed: Jun. 1, 2011

(86) PCT No.: PCT/CA2011/000636
§ 371 (c)(1),
(2), (4) Date: Jan. 22, 2013

(87) PCT Pub. No.: WO2011/150501
PCT Pub. Date: Dec. 8, 2011

(65) Prior Publication Data
US 2013/0214570 A1    Aug. 22, 2013

(30) Foreign Application Priority Data

Jun. 1, 2010  (CA) ...................................... 2706298

(51) Int. Cl.
| | | |
|---|---|---|
| *B60N 2/42* | (2006.01) | |
| *B60N 2/427* | (2006.01) | |
| *B60N 2/24* | (2006.01) | |
| *F41H 7/04* | (2006.01) | |
| *B60R 21/12* | (2006.01) | |

(52) U.S. Cl.
CPC .............. *B60N 2/42709* (2013.01); *B60N 2/24* (2013.01); *B60N 2/4242* (2013.01); *F41H 7/046* (2013.01); *B60R 21/12* (2013.01)
USPC ............... 297/216.1; 297/216.16; 297/216.17

(58) Field of Classification Search
USPC ................ 297/216.1, 216.15, 216.16, 216.17
See application file for complete search history.

(56) References Cited

U.S. PATENT DOCUMENTS

| | | | | |
|---|---|---|---|---|
| 3,059,966 | A | * | 10/1962 | Spielman ................. 297/216.17 |
| 3,532,379 | A | * | 10/1970 | Gonsalves, Jr. et al. . 297/216.17 |
| 3,762,505 | A | * | 10/1973 | Morse .................. 297/216.16 X |
| 3,868,143 | A | * | 2/1975 | Reilly ....................... 297/216.17 |
| 3,985,388 | A | * | 10/1976 | Hogan ..................... 297/216.17 |
| 3,986,748 | A | | 10/1976 | Magnuson |
| 4,005,765 | A | * | 2/1977 | Reilly .................... 297/216.1 X |
| 4,128,217 | A | * | 12/1978 | Mazelsky ............. 297/216.16 X |
| 4,150,805 | A | * | 4/1979 | Mazelsky ............... 297/216.1 X |
| 4,358,154 | A | * | 11/1982 | Campbell ............... 297/216.17 |

(Continued)

FOREIGN PATENT DOCUMENTS

CA          2504928        10/2006

*Primary Examiner* — Rodney B White
(74) *Attorney, Agent, or Firm* — Kane Kessler, P.C.; Paul E. Szabo

(57) ABSTRACT

Vehicle seats that reduce the potential for injury to occupants when the vehicle is subjected to a mine or similar explosive device. The seats are ceiling or wall mounted and include a trailing arm which allows for deflection while providing stability. The seat isolates the occupants from the chassis of the vehicle via a pneumatic or other shock absorber and/or a crushable element to provide protection from vertical and horizontal oriented blasts. These seats can also be combined with shock absorbing/isolating foot rests, appendage (leg) restrain systems and an occupant four-point harness to offer a completely integrated system. This integrated system reduces acceleration/deceleration related injuries, shock injuries to the lower legs, flailing injuries to the lower legs and internal collision injuries. Other options and alternatives are also described.

25 Claims, 15 Drawing Sheets

(56) References Cited

U.S. PATENT DOCUMENTS

| | | | |
|---|---|---|---|
| 4,359,200 A * | 11/1982 | Brevard et al. | 297/216.1 X |
| 4,408,738 A * | 10/1983 | Mazelsky | 297/216.16 X |
| 4,423,848 A * | 1/1984 | Mazelsky | 297/216.16 X |
| 4,474,347 A * | 10/1984 | Mazelsky | 297/216.16 X |
| 4,523,730 A * | 6/1985 | Martin | 297/216.17 X |
| 4,525,010 A * | 6/1985 | Trickey et al. | 297/216.17 |
| 4,655,416 A * | 4/1987 | Carnell et al. | 297/216.1 X |
| 5,273,240 A * | 12/1993 | Sharon | 297/216.17 X |
| 5,324,095 A | 6/1994 | Yamauchi | 297/216.16 X |
| 5,538,117 A * | 7/1996 | Bouchez | 297/216.1 X |
| 5,558,301 A * | 9/1996 | Kerdoncuff et al. | 297/216.17 X |
| 5,676,336 A * | 10/1997 | Nefy et al. | 297/216.17 X |
| 5,699,984 A * | 12/1997 | Pinault | 297/216.1 X |
| 6,056,366 A * | 5/2000 | Haynes et al. | 297/216.1 X |
| 6,179,380 B1 * | 1/2001 | Hoffman | 297/216.17 |
| 6,237,889 B1 * | 5/2001 | Bischoff | 297/216.1 X |
| 6,267,440 B1 * | 7/2001 | Hoffman | 297/216.1 |
| 6,378,939 B1 * | 4/2002 | Knoll et al. | 297/216.1 |
| 6,394,393 B1 * | 5/2002 | Mort | 297/216.17 X |
| 6,409,243 B1 * | 6/2002 | Hansen | 297/216.17 X |
| 6,585,190 B2 * | 7/2003 | Mort | 297/216.17 X |
| 6,820,931 B2 * | 11/2004 | Ruff et al. | 297/216.17 |
| 7,293,830 B2 * | 11/2007 | Marotta et al. | 297/216.17 |
| 7,413,247 B2 * | 8/2008 | Van Druff et al. | 297/216.17 |
| 7,445,181 B2 * | 11/2008 | Knoll et al. | 297/216.17 X |
| 7,628,357 B2 * | 12/2009 | Mercier et al. | 297/216.17 X |
| 7,735,917 B2 * | 6/2010 | Jones et al. | 297/216.1 |
| 7,744,155 B2 * | 6/2010 | List et al. | 297/216.17 |
| 8,091,964 B2 * | 1/2012 | Carter et al. | 297/216.17 |
| 8,439,420 B2 * | 5/2013 | Cantor et al. | 297/216.17 X |
| 8,550,553 B1 * | 10/2013 | Clark et al. | 297/216.17 |
| 8,702,147 B2 * | 4/2014 | Cantor et al. | 297/216.17 X |
| 2007/0035167 A1 * | 2/2007 | Meyer | 297/216.17 X |
| 2007/0096513 A1 * | 5/2007 | Jones et al. | 297/216.1 |
| 2008/0156602 A1 * | 7/2008 | Hiemenz et al. | 297/216.1 X |
| 2009/0045659 A1 * | 2/2009 | List et al. | 297/216.15 |
| 2009/0184545 A1 * | 7/2009 | Jones et al. | 297/216.1 |
| 2010/0207433 A1 * | 8/2010 | Hahn | 297/216.1 |
| 2010/0219667 A1 * | 9/2010 | Merrill et al. | 297/216.17 |
| 2010/0301647 A1 * | 12/2010 | Carter et al. | 297/216.1 |
| 2011/0285184 A1 * | 11/2011 | Greenwood | 297/216.1 |
| 2013/0221714 A1 * | 8/2013 | Greenwood et al. | 297/216.1 |

* cited by examiner

| ITEM NO. | SEAT REAR/QTY | PART NUMBER | DESCRIPTION |
|---|---|---|---|
| 1 | 1 | 4100589 | POST ASSEMBLY |
| 2 | 1 | 4100638 | SEAT BACK ASSY |
| 3 | 1 | 4100553 | ASSEMBLY, SEAT PAN |
| 4 | 6 | 23122 | SHCS .3125-18X0.75-SS |
| 5 | 1 | 4100629 | ASSY, TETHER |
| 6 | 2 | 4115315 | SCREW, SHLDR 1/2-13 X 3/8SH DIA X 1.00 LNG, ALLOY STEEL |
| 7 | 1 | 4115317 | SHOULDER SCREW, .50.38 SHOULDER, 0.3125 L, 5/16-18 THD - SS |
| 8 | 3 | 22210 | FLAT WASHER 3/8 SS 18-8 |
| 9 | 1 | 4115316 | SHOULDER SCREW, .50.38 SHOULDER, 0.625 L, 5/16-18 THD - SS |
| 10 | 1 | 4006742 | NYLON INSERT LOCKNUT, 5/16-18 UNC SS |
| 11 | 2 | 24494 | SEAT BELT ANTENNA BRACKET |
| 12 | 2 | 24679 | SCREW HEX HEAD CAP 7/16-20X1.5 GR8 ARMOURCOAT |
| 13 | 4 | 25038 | WASHER FLAT 7/16 18-8SS |
| 14 | 2 | 25041 | WASHER LOCK 7/16 18-8 SS |
| 15 | 2 | 25043 | NUT ACORN 7/16-20 5/8W 11/16H 18-8 SS |
| 16 | 4 | 500-684 | WASHER FLAT 1/4 18-8 SS |
| 17 | 2 | 4011637 | NYLON INSERT LOCKNUT, 1/4-20 UNC-SS |
| 18 | 1 | 4100564 | SEAT CUSHION, WIDE |
| 19 | 1 | 4100645 | BACK REST, FOAM CUSHION |
| 20 | 1 | 4100666 | SEAT BELT HARNESS ASSY |
| 21 | 2 | 4115314 | SLEEVE BEARING, 5/8ID X 1"L .3/4OD, 954 BRONZE |
| 22 | 1 | 4115318 | GAS SPRING 90 LBS 6 TO 15" SS |
| 23 | 2 | 25042 | SCREW HEX HEAD CAP 7/4-20 X 1.25 FULL THREAD 18-8SS |

BLAST ATTENUATION SEAT

FIELD OF INVENTION

This invention relates to the seating utilized in vehicles used by armed forces to provide strategic and tactical support on modern battlefields. In particular, the invention relates to vehicle seats designed to mitigate passenger injury and possible death, from mines and other explosive devices.

BACKGROUND OF THE INVENTION

The requirement for crew blast protection in armoured vehicles has been an element of the technical specifications for armoured tracked and wheeled vehicles for many years. The interest in more effective protection has risen in recent years with the increased use of IEDs (improvised explosive devices) and high-powered mines.

Proposed solutions to this problem have centered primarily on the philosophy that adding more armour plating would deflect the blast. However, there is a limit to the amount of additional armour that vehicles can accommodate without severely limiting their capabilities. Some current vehicle platforms consider weight as a critical, performance-related factor. As a result, a lighter, more efficient mine blast protection solution is advantageous.

Other attempts to address this problem have used systems of straps to suspend vehicle seats, or have used simplistic energy-absorbing systems. However, none of these systems have appreciated the vast amount of energy that must be absorbed or the complexity of the dynamics of an explosion. Many of these systems will be destroyed, distorted or seize under the energy of a blast, making them ineffective. And some systems are ineffective regardless, such as the strap suspension systems which do little more than launch the passenger into the roof of the vehicle or allow him to collide with the sides of the vehicle in the event of an explosion. None of these proposed solutions have been particularly effective in reducing injury and death of vehicle occupants.

There is therefore a need for a blast attenuation seat which obviates or mitigates at least some of the disadvantages in the art.

SUMMARY OF THE INVENTION

It is an object of the invention to provide an improved blast attenuation seat.

In one embodiment of the invention there is provided a vehicle seat comprising: a vertically disposed post, the upper end having a bracket for mounting to a vehicle; a vertically disposed tube slidably engaged about the post; a passenger seat, mounted to the tube; a shock absorber, one end of the shock absorber being fixed to the post and the other end being fixed to the tube; and a trailing arm, one end of the trailing arm being pivotally connected to the lower end of the post, and the other end being pivotally connected to the vehicle, providing stability.

In another embodiment of the invention there is provided a shock absorbing seat comprising: a shock absorber fixed to the roof or wall of a vehicle; a seat suspended from the shock absorber; and a linkage, pivotable in multiple dimensions, between the bottom of the seat and the vehicle, to maintain stability of the seat.

In an additional embodiment of the invention there is provided a lateral energy attenuation system comprising: a crushable element; a mechanical portage allowing the crushable element to deform while protecting it from damage during day to day use in a military vehicle; and brackets for mounting ends of the mechanical portage on the seat and the vehicle.

The blast protection seats of the invention are optimized for use in armoured tracked and wheeled vehicles to minimize the potential for injury to occupants when the vehicle detonates a mine, but may also be used in other vehicles. The risk of injury is significantly reduced by isolating the occupants from the chassis of the vehicle (thereby minimizing vertically- and horizontally-oriented shock induced injuries) and restraining appendages, including the head (minimizing flailing and whiplash related injuries).

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The present invention will be further understood from the following detailed description with reference to the drawings in which:

FIG. 4A provides a cross-sectional detail view of the seat pan, corresponding to portion A of FIG. 4;

FIG. 20 presents a bill of materials for a vehicle seat in an embodiment of the invention.

DETAILED DESCRIPTION OF THE PREFERRED EMBODIMENT

Figure 1:
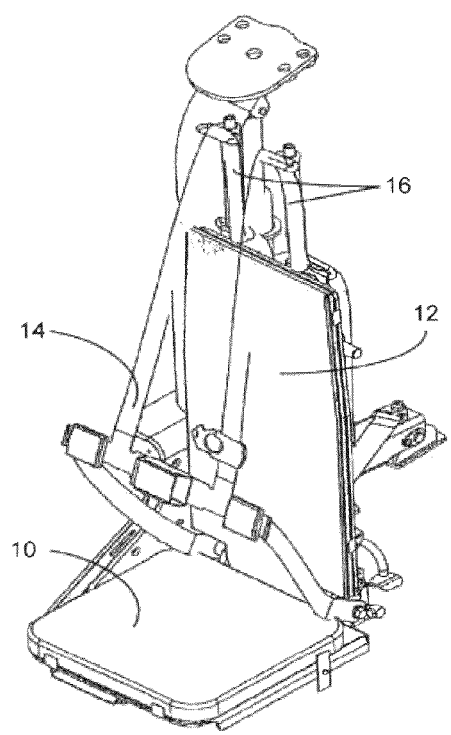
FIG. 1 presents a front isometric view of a vehicle seat in an embodiment of the invention.

The invention provides a stabilizing connection at the bottom of a ceiling mounted or wall mounted vehicle seat, while allowing floor deformation due to a blast event. This represents a step forward in understanding of vehicle deformation during blast events and what is required to mitigate damage to the passenger.

The system includes a multi-dimensional link between the bottom of the seat and the vehicle structure. This may be implemented using a trailing arm, and/or a combination of a trailing arm and tether assembly, as shown in the figures. The multi-dimensional stabilizing feature increases the probability that the seat will provide attenuation during a blast event, minimizing injury to the occupant.

Blast attenuation seats require some degree of stabilization in order to function properly during a blast event, due to forces imposed on the seats. In some events, deformation of the vehicle will result in damage to the seat and/or post assembly, preventing the blast seat attenuation system from functioning properly. For example, blast forces could cause various components to jamb or fail, particularly if deformation causes the mechanical advantage of the design to be lost. The blast attenuation seat trailing arm described herein provides a multi-degree of freedom connection at the lower end of the seat post and vehicle which allows for deformation of the vehicle, while maintaining the integrity of the attenuation system.

Operational and scientific experience has demonstrated the impact of mine blasts on vehicles and on the occupants of the vehicles. Seated occupants inside a vehicle subjected to a mine blast, experience:

a vertical and/or horizontal acceleration associated with the initial detonation of the mine;

in the case of a vertical blast, a brief period of weightlessness as the vehicle and the personnel reach the apogee (maximum height);

a vertical deceleration associated with the vehicle and occupants hitting the ground;

pitching and flailing due to movement/rotation of the vehicle and the occupants; and internal collisions between the body of the occupant and the inside of the vehicle.

The magnitude and duration of the G (gravitational multiplier) loading to which the occupants are subjected will vary depending on the size of the explosive, its depth in the ground, the condition of the ground, the type of vehicle and the type of seating being utilized. A "perfect" vertical acceleration rarely occurs because the mine is usually detonated when a front corner of the vehicle (wheel or section of tread) passes over it. As a result the mine blast imparts an off-centre rotation, or pitching motion, to the vehicle/occupants in conjunction with the vertical acceleration.

Recently, roadside explosions have subjected vehicles (and occupants) to serious blast loading in a horizontal or lateral oriental (i.e. sideways with respect to the direction of travel). For troops seated in side-facing seats in same areas of some vehicles, this sideways oriented acceleration can also cause serious injury. This has been addressed with a lateral (or horizontal) energy attenuation feature (see FIGS. 17, 18 and 19).

A typical mine explosion (such as a 8 kg anti-tank mine) will impart a 200 G load on the vehicle. The configuration of the vehicle seating and suspension and the location of the explosion, with regard to the occupants, will result in the occupants of the vehicle experiencing approximately 80 Gs. Pulse durations are usually in the 10 ms range. Scientific data indicates that the human body can tolerate approximately 20 G pulses for 10 ms without experiencing injury.

The present invention is a seating system that significantly reduces the levels of injury experienced by occupants in a vehicle subjected to a land mine, roadside blast or similar event. Specifically:

acceleration/deceleration related injuries are reduced by attenuating the level of shock transmitted from the vehicle chassis to the occupants in the vertical and horizontal directions. This is accomplished by decoupling the occupant from the vehicle chassis by means of a multiple link pedestal, consisting of a shock absorbing system and/or a crushable element. This system allows the seated occupant to move with respect to the vehicle during the vertical high G acceleration (initial explosion) and vertical high G deceleration (return to ground) thereby decreasing the shock levels experienced by occupant and laterally with respect to the vehicle in the case of a roadside blast;

shock injuries to the lower legs are reduced by isolating the occupant's feet/legs from the floor of the vehicle;

flailing injuries to the lower legs may be reduced by restraining the occupant's legs such that they cannot move significantly with respect to the occupant's torso; and internal collision injuries are reduced by restraining the occupant to the seat with a four-point restraint system.

The seating system may include the following:

1) The trailing arm, which provides stability for the seat while allowing for deflection of the hull attachment points in a blast event.

2) Seat belt "antennas" which support the belts in the optimum position.

3) A cantilevered seat pan which has a unique profile to get the pan as thin as possible while still meeting strength requirements.

4) A support post providing a housing for a spring shock (which provides energy attenuation) and allowing adjustment of the driver seat height.

5) A shear pin system which isolates the energy attenuation system from normal road loads until a blast breaks the shear pin, bringing the energy attenuation system into play.

6) A lateral energy attenuation system which provides attenuation of sideways (with respect to the vehicle) oriented blasts.

Figure 2:
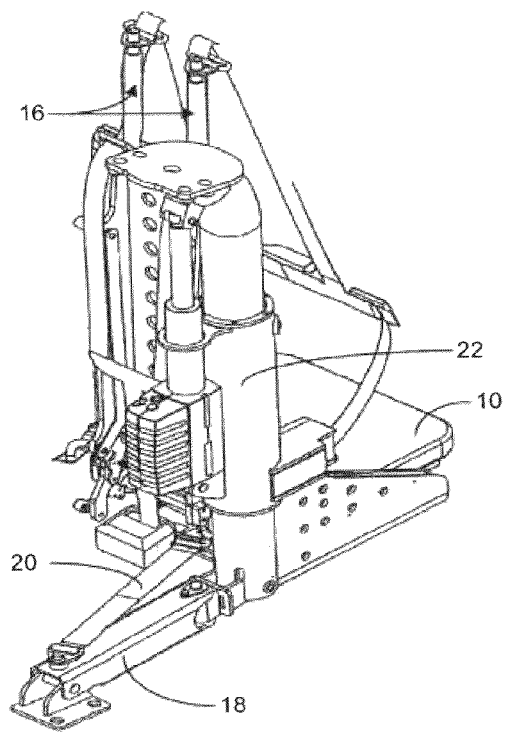
FIG. 2 presents a rear isometric view of a vehicle seat in an embodiment of the invention.

FIGS. 1 and 2 present isometric views of an exemplary seat assembly, from the front and rear respectively. The primary components of the seat pan 10, seat back 12, four-point restraint system 14, seat belt antennas 16, trailing arm assembly 18, tether 20, and shock post assembly 22 are all clearly visible. The materials used for the seat system could be all steel, all aluminum or any combination of the two, plus other materials such as bronze, nylon, etc. at wear points. Other materials could also be used as required.

Figure 3:
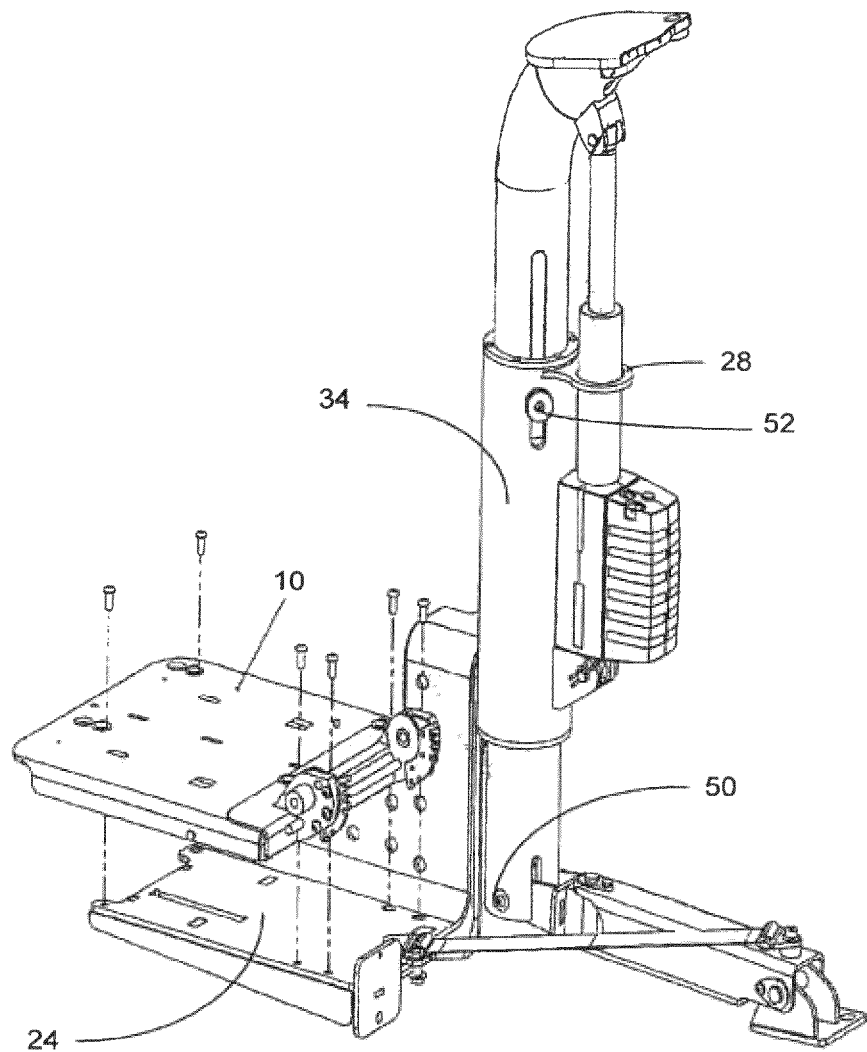
FIG. 3 presents a rear isometric view of a vehicle seat in an embodiment of the invention, with the seat cushioning, seat back, occupant harness and antenna system removed. This Figure also provides an exploded view of the seat pan assembly.
Figure 4:
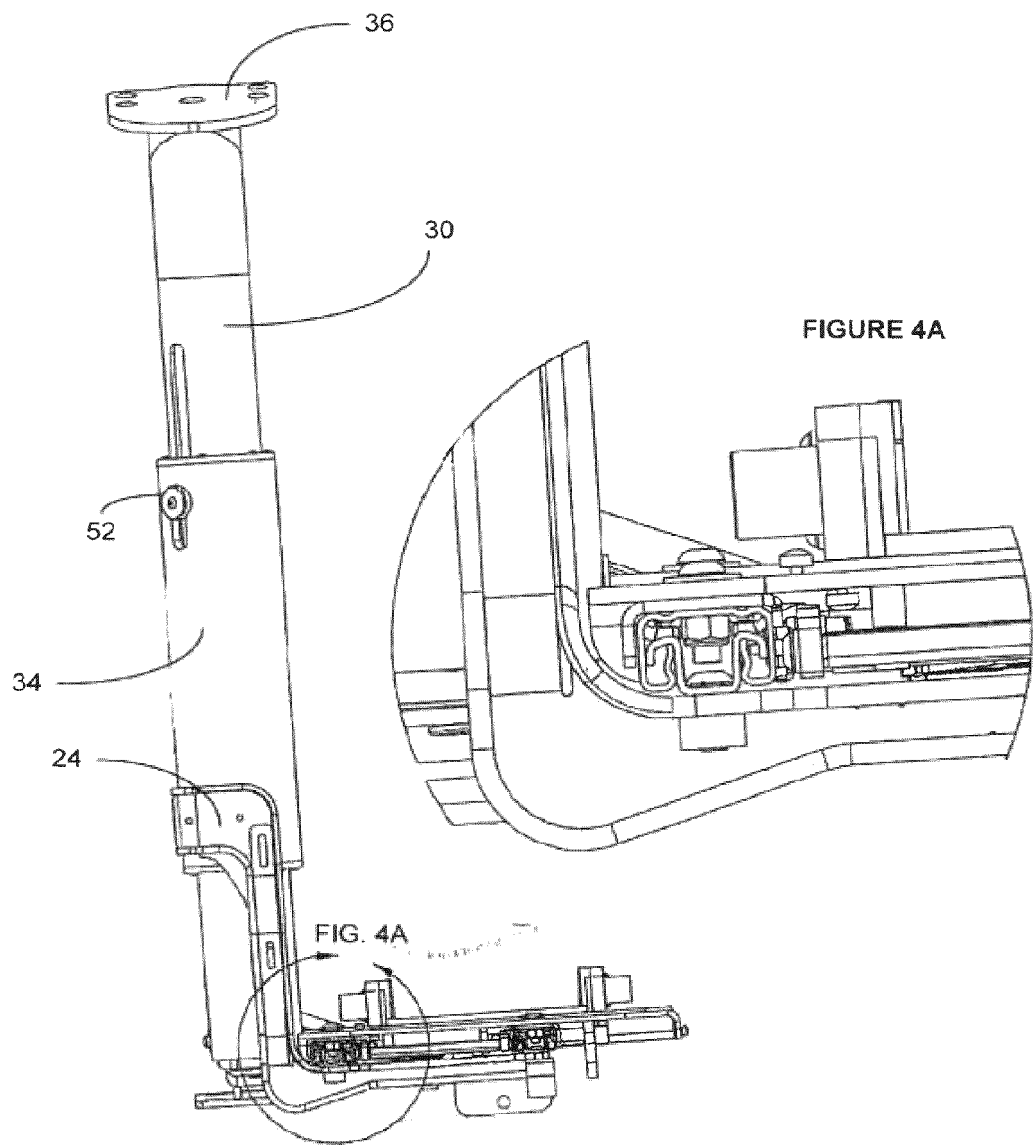
FIG. 4 presents a side view of a vehicle seat, with a cross-section of the seat pan, in an embodiment of the invention.

The seat pan 10 has a unique profile to get the pan as thin as possible while still meeting strength requirements. There are two aspects to the seat pan design: those which are due to the location of the shock post assembly 22 (i.e. behind the passenger and to the side), and those related to the seat pan 10 being basically a cantilever. The cantilevered, low profile seat pan 10 is strong, light and thin. It could be implemented as shown in FIGS. 3, 4 and 4A, or using other combinations of breaks, webs, stiffeners, corrugations, etc. The seat pan support 24 is welded to the sleeve 34 of the shock post assembly 22. The seat pan 10 is bolted to the seat pan support 24 and is covered with a seat cushion. Leg restraints (not shown in the figures) would typically be secured to the seat pan 10. As noted above, leg restraints are helpful in avoiding leg injuries, particularly from flailing.

The seat back 12 is of similar construction to the seat pan 10, but can be of somewhat lighter construction given the lighter loads that it will see. The seat back 12 is typically cushioned, and may include a head/helmet bracing system (not shown in the figures) to reduce head flailing injuries and whiplash.

The seat belt "antennas" 16 are posts which support the upper belts of the four-point restraint system 14 in the optimum position. The antennas 16 may be adjustable or fixed, and the positions of the upper belts on the antennas 16 may be adjustable or fixed. All of the belts of the four-point restraint system 14 are secured to the seat system itself, and are not anchored to the vehicle. Thus, the belts move in unison with the seat system.

Figure 5:
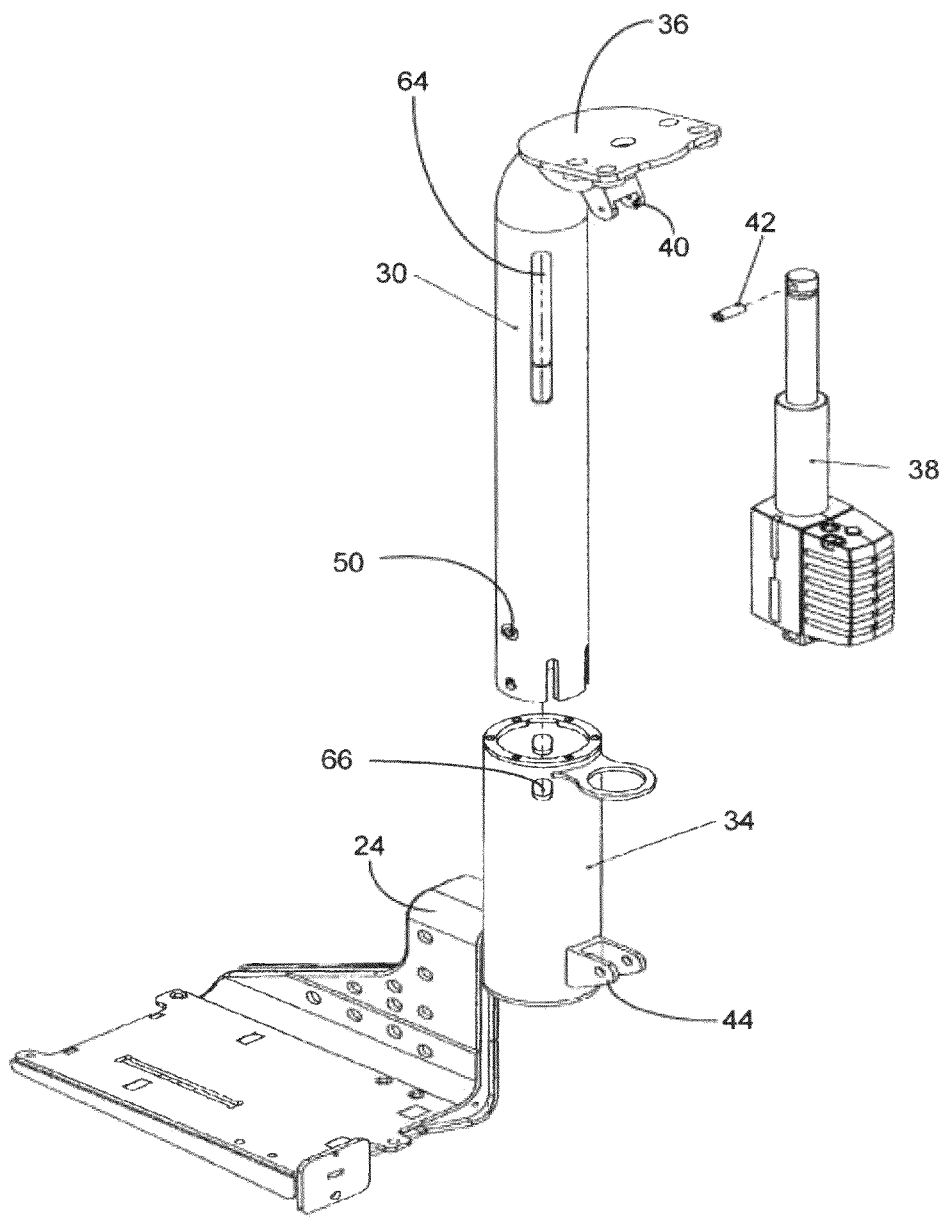
FIGS. 5 through 8 present details of an exemplary shock post assembly.
Figure 6:
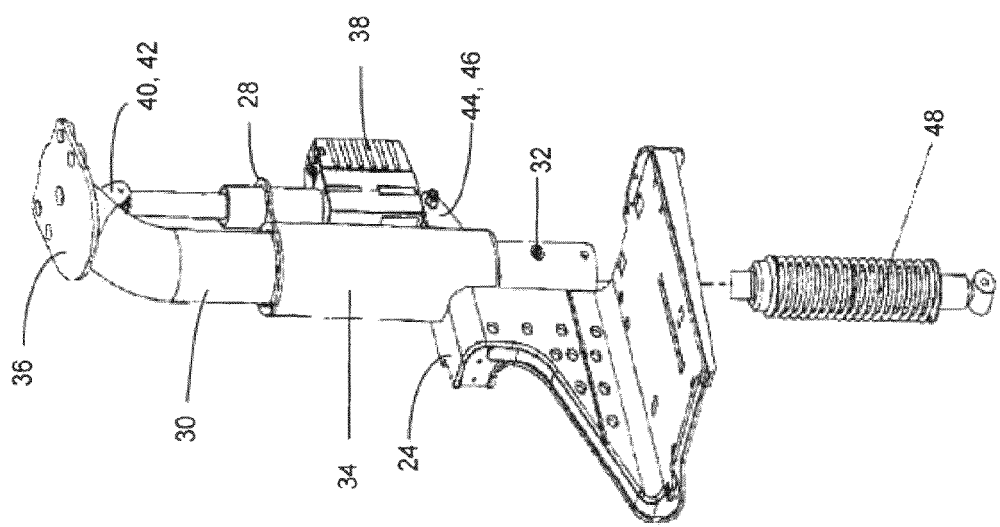

As shown in FIGS. 5 and 6, the shock post assembly 22 is composed mainly of a post portion 30 which slides vertically within and through the tubular sleeve 34. The post portion 30 terminates at an upper end, with a mounting plate 36 which is fastened to the roof of the vehicle. Alternatively, the upper end of the post portion 30 could be mounted on the wall of the vehicle, for example, by means of the same mounting plate 36, rotated by 90 degrees. As will be explained, the lower end of the post portion 30 is stabilized by the trailing arm assembly 18.

The vertical position of the post portion 30 within the sleeve 34, is determined by the linear actuator 38. The top end of the linear actuator 38 is fixed to the post portion 30 and/or mounting plate 36 with a welded yoke 40 and shear pin 42. The lower end of the linear actuator 38 is fixed to the sleeve 34 with a second welded yoke 44 and pin 46 arrangement. The linear actuator 38, could be, for example an electrically-driven screw actuator such as Thomson Electrak Pro with an 8" stroke. Under normal operation, the linear actuator 38 adjusts the vertical position of the seat pan 10 to accommodate the height of the passenger. The height of the seat could be adjusted by mechanical manual, hydraulic, electric actuator or any other similar means.

The vertical position of the post portion 30 with respect to the sleeve 34, is determined by the linear actuator 38 until the shear pin 42 is sheared by an explosive event. An explosive event under the vehicle will cause the vehicle to rise, of course, causing the vehicle roof to rise as well. The post portion 30 will rise with the vehicle roof, while the inertia of the seat and passenger will resist this motion, placing a downward force on the middle of the shear pin 42. When the shear pin 42 fails, the linear actuator 38 is mechanically disconnected from the seat system, and the relative position of the post portion 30 and sleeve 34 is then governed by a spring shock 48.

Figure 7:
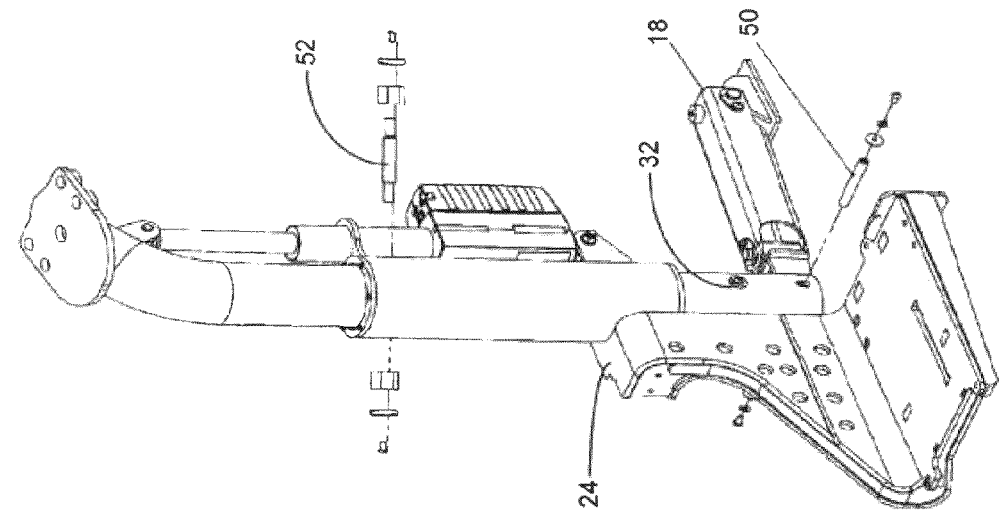
Figure 8:
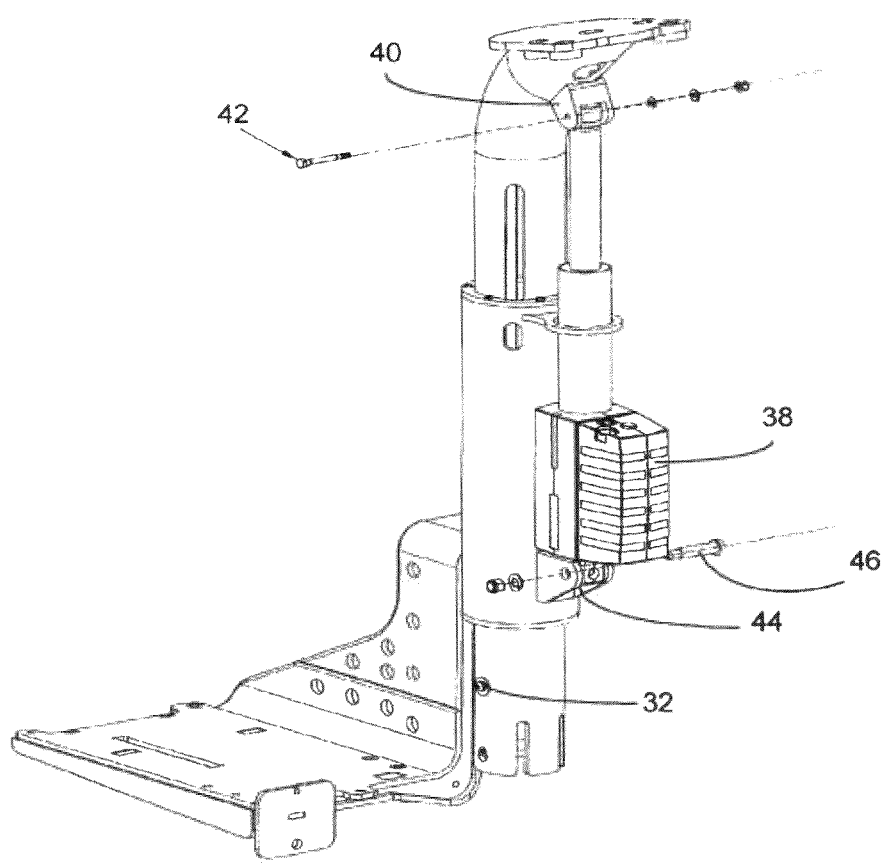

The spring shock 48 sits inside the post portion 30 and the sleeve 34, the post portion 30 and sleeve 34 serving as a housing for the spring shock 48. The upper end of the spring shock 48 is fixed to the post portion 30 via pin/washer/nut assembly 52 (see FIGS. 3 and 7), passing through the elongated slot 64 in the post portion 30 (see FIG. 5), and through the slot 66 in the sleeve 34 (also shown in FIG. 5). The lower end of the spring shock 48 is fixed to the post portion 30 via pin/washer/nut assembly 50. The spring shock 48 may share the same pin/washer/nut assembly 50 as the trailing arm assembly 18, or alternatively, use a separate pin/washer/nut assembly 32 (see FIGS. 6, 7 and 8). Vehicle constraints of seat stroke length limits can be addressed by moving the bottom spring shock pin/washer/nut assembly to a higher location on the post portion 30 by adding an additional pin as shown (pin/washer/nut assembly 32), thereby limiting its travel to not have the seat strike the vehicle floor at the stoke bottom. This keeps all other geometry of the seat system common. The spring and shock absorber are both sized to optimize the protection based on the designed threat and available seat stroke.

Again, it is only when the shear pin 42 fails that the spring shock 48 bears the weight of the passenger and the vehicle seat, by supporting the weight of the seat pan 10, sleeve 34, and related components, with respect to the post portion 30. The welded yoke 40 has a stop incorporated into it which the ram of the linear actuator 38 will stop against. The linear actuator 38 has a guide 28 which keeps the ram in line with that stop. In the event of a vehicle roll over with a broken shear pin 42, the seat can never migrate up the post portion 30, higher than its last height adjustment as the ram of the linear actuator 38 striking the stop will prevent it from moving. This protects the occupant from head injuries while upside down.

With the vehicle seat system described thus far, the primary components of the safety system are provided. The shear pin system isolates the energy attenuation system from normal road loads. That is, prior to a blast event, the weight of the passenger sits on the shear pin 42 and not on the spring shock 48. It is only when a blast occurs, that the shear pin 42 fails and the spring shock 48 bears the load of the passenger, allowing movement of the seat pan 10 and the sleeve 34, the energy of the blast being absorbed by the spring shock 48.

However, the trailing arm assembly 18 and tether 20, provide valuable stability for the seat while allowing for deflection of the hull attachment points in a blast event. This allows the seat system to maintain the mechanical integrity which provides protection for the passenger. As noted above with regard to the prior art, other energy absorbing systems can be destroyed or distorted by the energy of the blast, which causes them to seize, jam or fail in some other manner. The trailing arm assembly 18 and tether 20, provide stability, allowing the energy absorbing components to function effectively. The trailing arm assembly 18 mounted to vehicle has the ability to lift and/or turn in a blast event as the deflection direction cannot be predicted.

Figure 9:
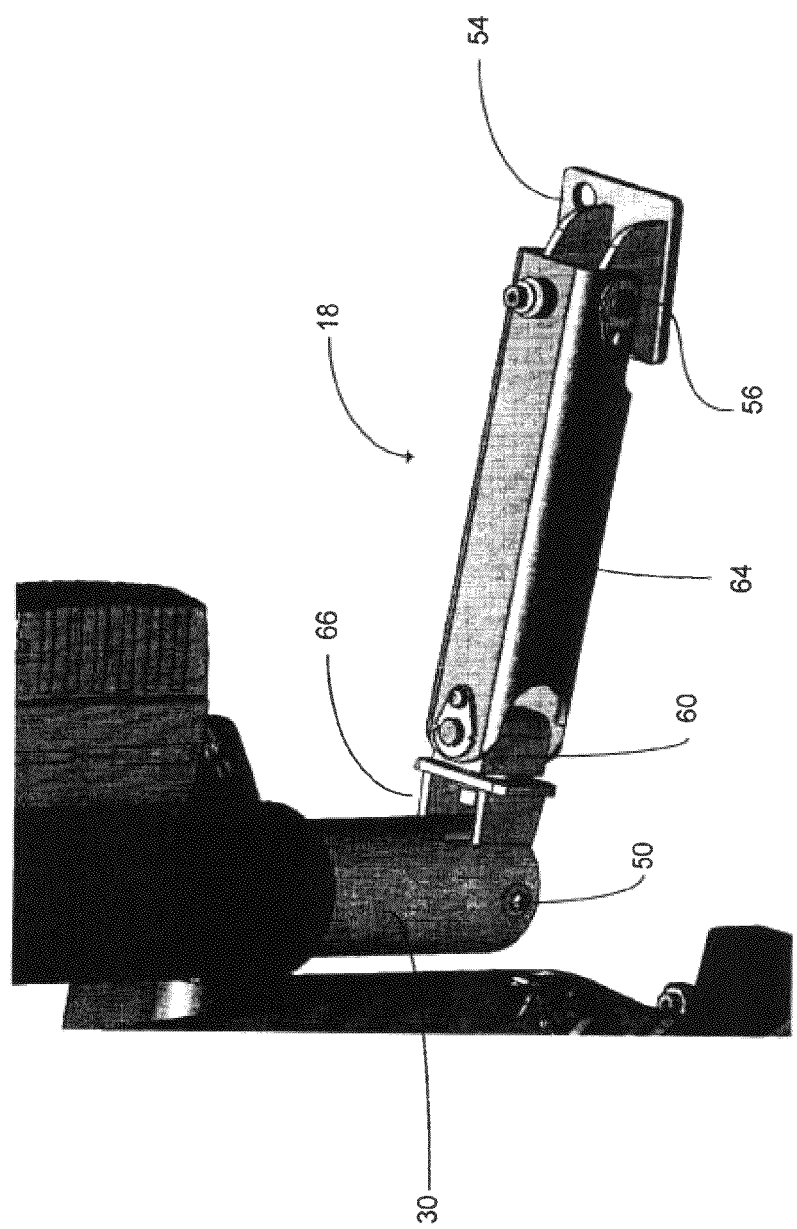
FIGS. 9 through 14 present details of an exemplary trailing arm.
Figure 10:
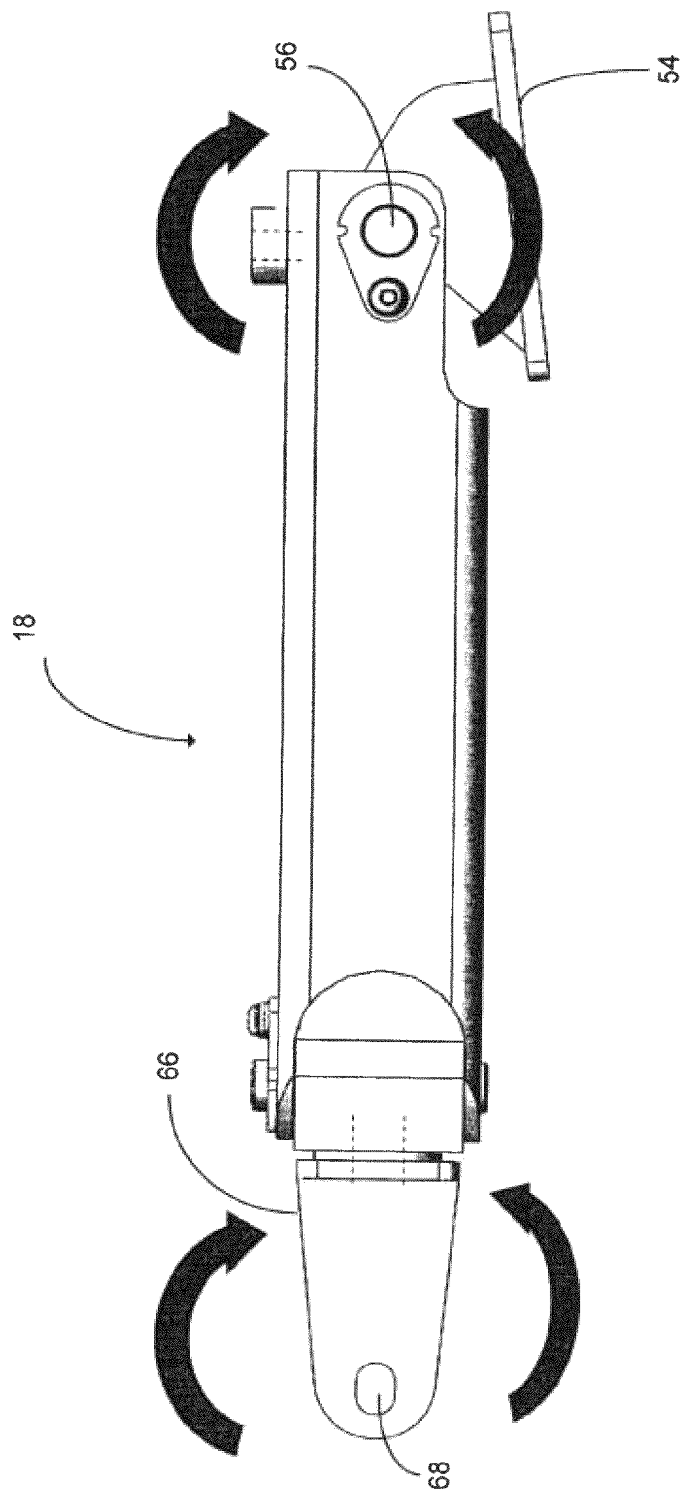

As shown in the isometric drawing of FIG. 9, the trailing arm assembly 18 comprises a trailing arm 64 (i.e. a length of steel or aluminum channel) that is pivotally connected to the post portion 30 of the seat assembly via pin/washer/nut assembly 50 and clevis 66. This allows rotational motion in the vertical plane, between the post portion 30 and clevis 66. The other end of the trailing arm assembly 18 is fixed to the vehicle via a bracket 54 and pin 56. This also allows rotation in the vertical plane, between the trailing arm 64 and the bracket 54. These two degrees of freedom are shown in the side view of the trailing arm assembly 18, in FIG. 10.

The pivot at the seat end of the trailing arm assembly 18 (about pin 50) allows the trailing arm 64 to rotate up about this pivot point in the event the floor raises globally where the trailing arm is mounted. A slotted hole 68 at this front pivot minimizes the push or pull on the bottom of the post portion 30 to protect it from excessive forced displacements. The rear pivot (about pin 56) allows the bracket 54 which mounts to the vehicle to rotate about this pivot to accommodate local floor transformations.

Figure 11:
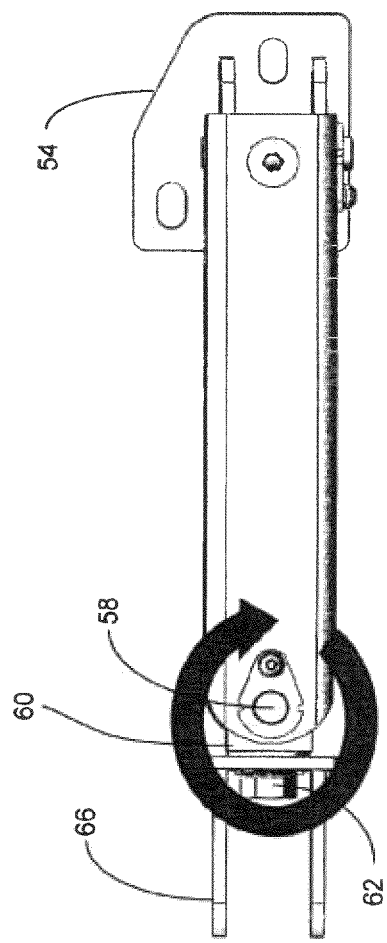

As shown in FIG. 11, the clevis 66 is fastened to the trailing arm assembly 18 by means of another pin 58, allowing horizontal pivoting between the clevis 66 and trailing arm 64. This horizontal pivoting allows the vehicle trailing arm seat attachment point to be transformed to the right or left without significantly affecting the seat.

Figure 12:
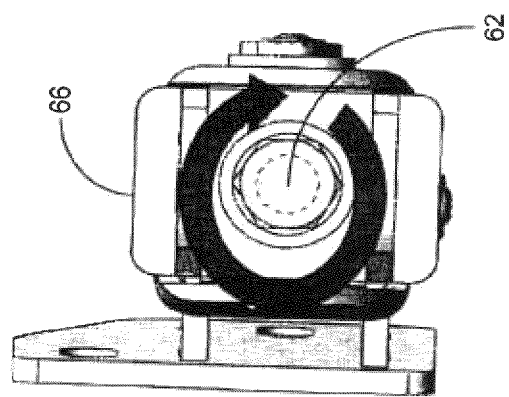

The clevis 66 is also free to rotate with respect to joint block 60, as shown in the end view of FIG. 12, being fixed to the joint block 60 via bolt 62. The pivot shown in FIG. 12 allows the trailing arm seat attachment point to be transformed in a local rotation about this pivot. Thus, the clevis 66 and block 60 combine to form a universal joint between the post portion 30 and the trailing arm 64.

Figure 13:
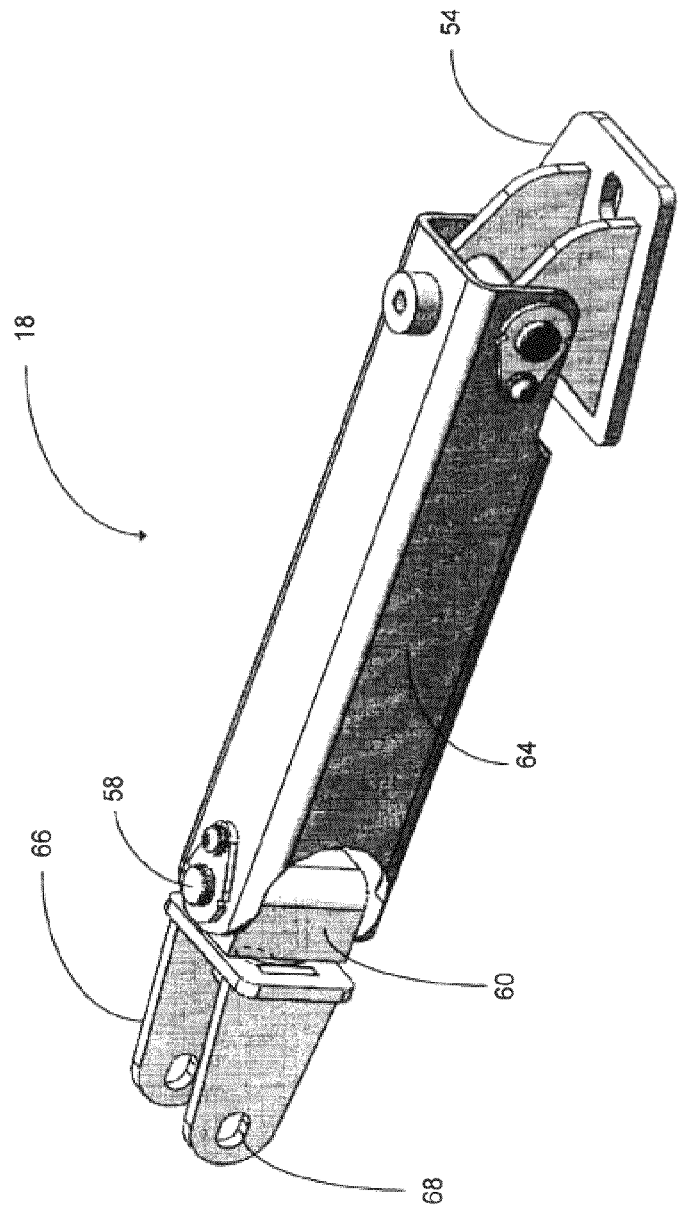

The complete trailing arm assembly 18 is shown in the isometric view of FIG. 13. The movements of the vehicle attachment point for the trailing arm assembly 18 are minimally translated to the seat structure as the pivots transform these movements mostly into trailing arm rotations locally and globally. The slot 68 at the front pivot of the trailing arm assembly 18 and the bottom of the seat structure allows some of the small forced displacements resulting from these rotations to be minimized.

Figure 14:
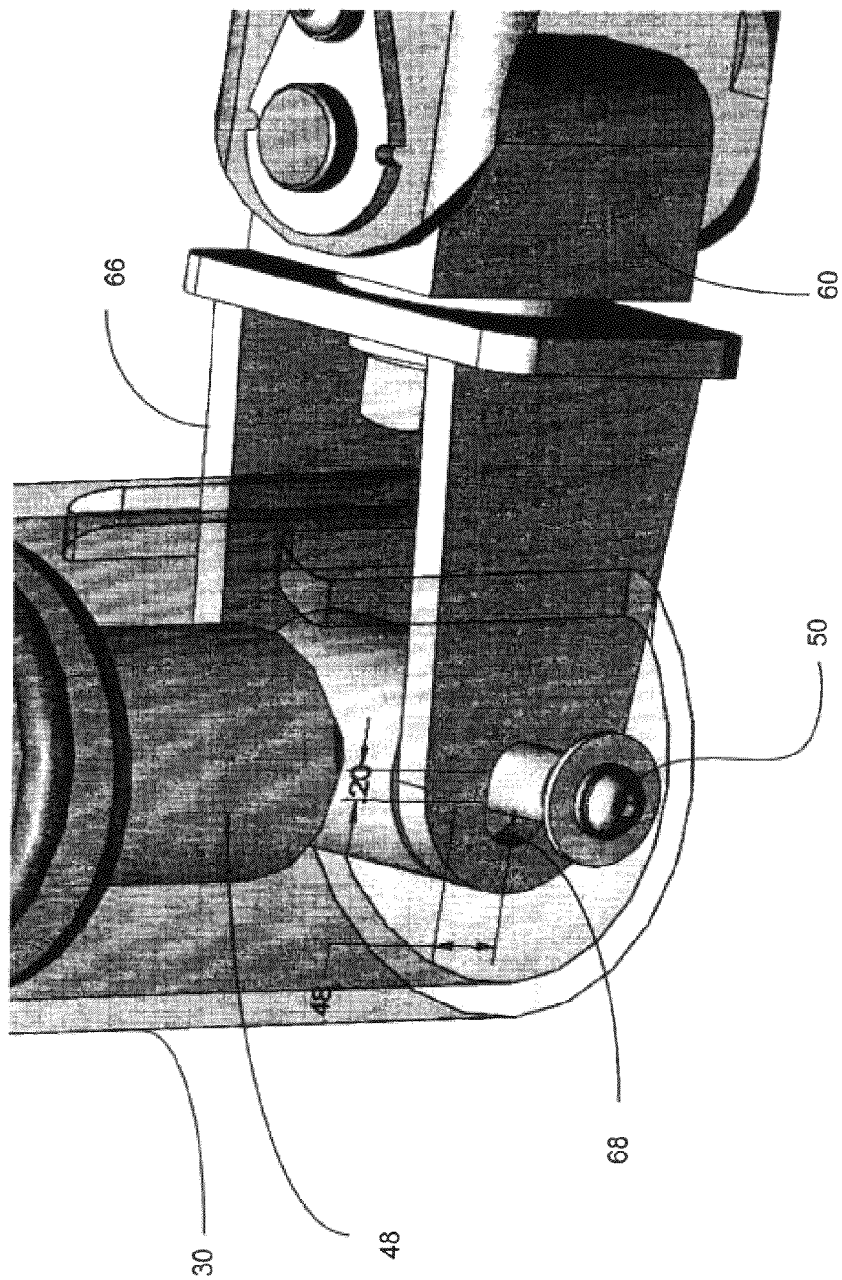

FIG. 14 presents a transparent detail showing the interrelationship of the clevis 66, pin/washer/nut assembly 50, post portion 30, spring shock 48 and slot 68.

Figure 15:
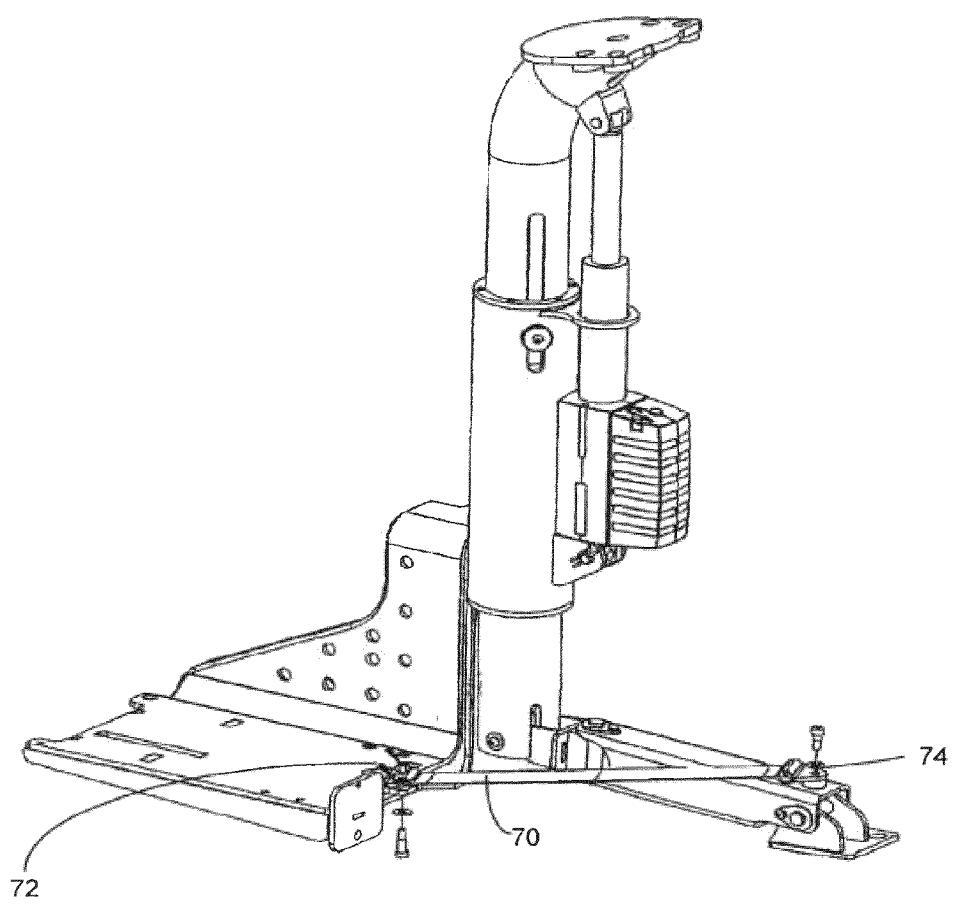
FIG. 15 presents a rear isometric view of a vehicle seat in an embodiment of the invention, with the seat cushioning, seat back, occupant harness and antenna system removed. This Figure also shows how the tether system is pinned to the seat pan and vehicle end of the trailing arm.

FIG. 15 shows the components of the tether 20 in greater detail. The tether 20 consists of a strap 70, terminated with eyes 72, 74 at each end. These eyes 72, 74 are pinned to the seat pan 10 and trailing arm assembly 18 to minimize rotation of the seat when there is a frontal impact on the vehicle. This is particularly desirable when the seat pan 10 is mounted off-center to the centerline of the post portion 30.

Figure 16:
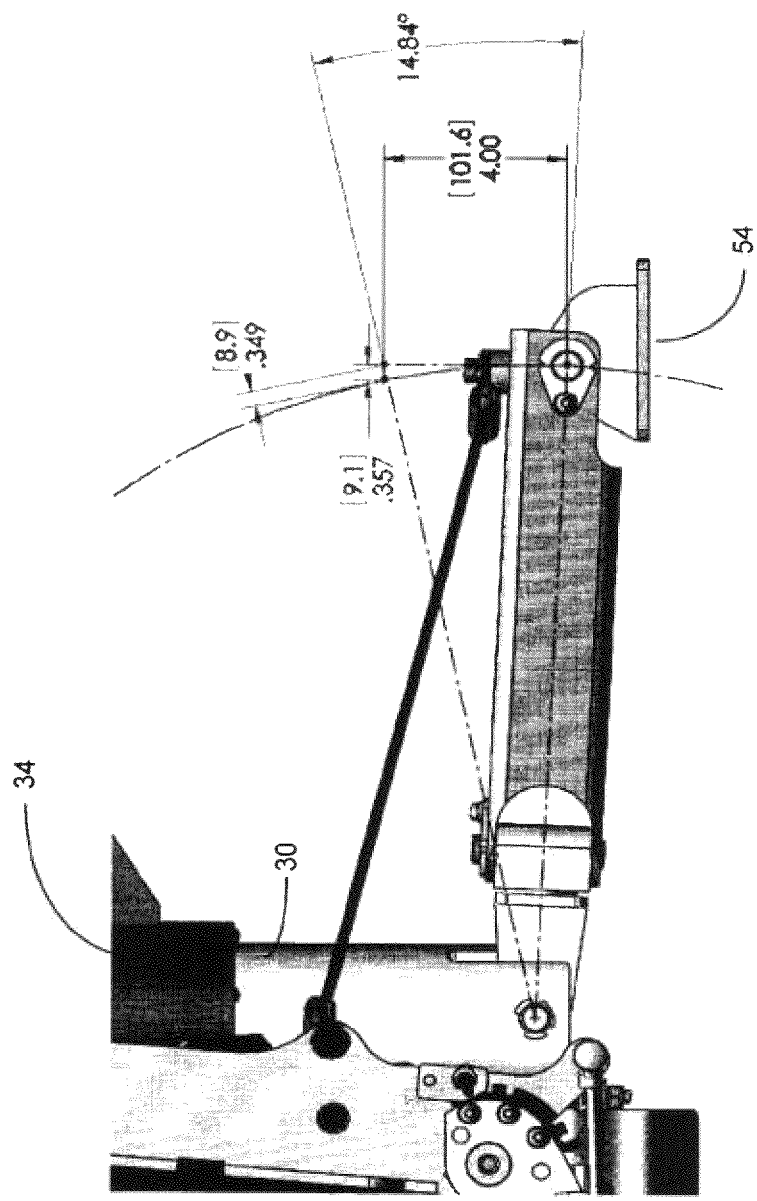
FIG. 16 presents dimensions under deflection, for an exemplary trailing arm assembly.

FIG. 16 shows how a 4" vertical displacement at the trailing arm bracket 54 would translate into a 0.349" movement at the seat bottom. The dimensions are for an exemplary implementation of the system. When an explosive event occurs, the floor of the vehicle may be come seriously distorted. If the floor rises by 4", this will cause the trailing arm assembly 18 to rotate in a vertical plane by approximately 14.84°. This rotation will cause a horizontal deflection of the post portion 32 by about 0.349" which is not great enough to compromise the energy attenuation system.

Figure 17:
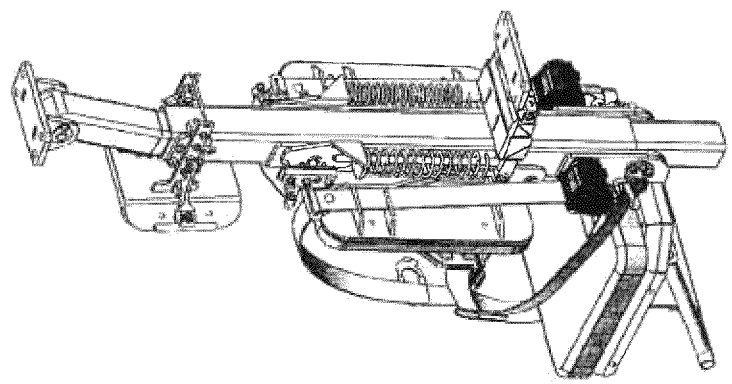
FIGS. 17, 18 and 19 present isometric views of an exemplary lateral energy attenuation system.
Figure 19:
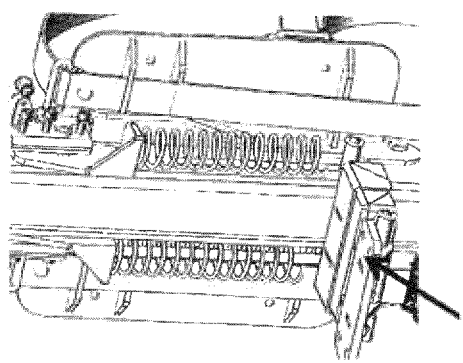
Figure 18:
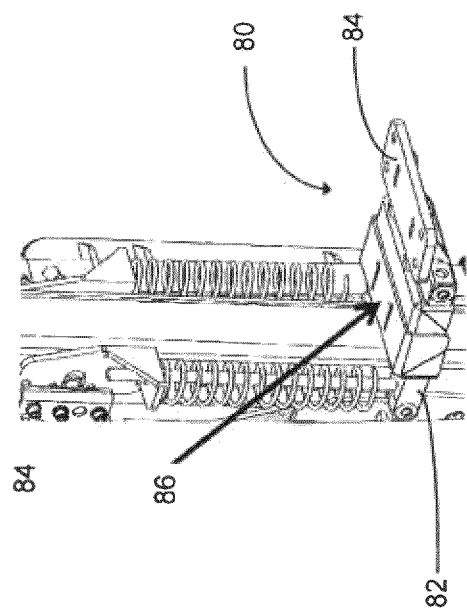

FIGS. 17, 18 and 19 present an exemplary implementation of the lateral energy attenuation system 80 which provides attenuation of sideways (with respect to the vehicle) oriented blasts.

The lateral energy attenuation system 80 consists of two mounting plates 82, 84 one of which is mounted to the seat assembly (mounting plate 82), and the other being mounted to the vehicle (mounting plate 84). The mounting plates 82, 84 are fixed to opposite ends of an energy absorbing component 86. This energy absorbing component 86 may be implemented in various ways, including for example:

- a pair of mating housings as shown in FIGS. 17, 18 and 19 containing a crushable substance. The mating housings provide a mechanical portage for the crushable element, allowing it to deform while protecting it from damage during day to day use in a military vehicle;
- a spring-shock; or
- other similar energy absorbing materials or systems.

The lateral energy attenuation system 80 may be installed in various orientations, and more than one may be used.

In use, the vehicle seat is mounted to the ceiling or wall of the crew cab of the vehicle (though it may be mounted to the floor, by reversing the arrangement completely). The occupant sits on the seat and places his/her feet on the optional foot supports, which isolate the feet from the floor. The occupant will restrain themselves in the seat with the four-point harness system and restrain their legs with the optional foot/leg restraint straps.

In the event of a mine detonation under the vehicle, the vehicle will accelerate upwards due to the force of the explosion and experience a maximum G loading. The shock attenuation system will decouple the seat assembly from the vehicle so that the seat will not move as quickly or as far as the vehicle chassis, thereby exposing the occupant to significantly less G loading than the vehicle chassis experiences.

In the event of a mine blast next to the vehicle, the vehicle or part of vehicle to which the seat is connected, will accelerate laterally. The lateral energy attenuation system crash thereby protects the occupant from the laterally (or horizontally) oriented forces.

The present invention has been described with regard to one or more embodiments. However, it will be apparent to persons skilled in the art that a number of variations and modifications can be made without departing from the scope of the invention as defined in the claims.

All citations are hereby incorporated by reference.

What is claimed is:

1. A vehicle seat comprising:
   - a vertically disposed post, having an upper end and a lower end, the upper end of said post having a bracket for mounting to a vehicle;
   - a vertically disposed tube slidably engaged about said post;
   - a passenger seat, mounted to said tube;
   - a shock absorber, one end of said shock absorber being fixed to said post and the other end of said shock absorber being fixed to said tube; and
   - a trailing arm, one end of said trailing arm being pivotally connected to the lower end of said post, and the other end of said trailing arm for being pivotally connected to said vehicle;
   - further comprising a linear actuator for adjusting the height of the passenger seat.

2. The vehicle seat according to claim 1, wherein said one end of said linear actuator is fixed to said post with a shear pin, and the other end of said linear actuator is fixed to said tube, the shear pin bearing the weight of said passenger seat until failing, at which point the shock absorber bears the weight of said passenger seat.

3. The vehicle seat according to claim 1, wherein said shock absorber comprises a spring shock.

4. The vehicle seat according to claim 1, wherein said trailing arm is connected to the lower end of said post with a universal joint, pivoting in both vertical and horizontal planes.

5. The vehicle seat according to claim 1, wherein said trailing arm pivots with respect to said vehicle in a vertical plane.

6. The vehicle seat according to claim 1, wherein said post comprises a bracket for roof mounting.

7. The vehicle seat according to claim 1, wherein said post comprises a bracket for wall mounting.

8. The vehicle seat according to claim 1, further comprising a fabric tether assembly to prevent rotation of said seat about said post.

9. The vehicle seat according to claim 8, wherein a first end of said tether is pinned to a seat pan.

10. The vehicle seat according to claim 1, wherein all of the components of said vehicle seat are fabricated out of steel.

11. The vehicle seat according to claim 1, wherein all of the components of said vehicle seat are fabricated out of aluminum.

12. The vehicle seat according to claim 1, wherein the seat comprises a crushable material/deformable material.

13. The vehicle seat according to claim 1, further comprising a lateral energy attenuation system.

14. The vehicle seat according to claim 13, wherein the lateral energy attenuation system comprises: a crushable element; a mechanical portage allowing the crushable element to deform while protecting it from damage during day to day use in a military vehicle; and brackets for mounting ends of the mechanical portage on the seat and the vehicle.

15. A shock absorbing seat comprising:
   - a shock absorber fixed to a roof or wall of a vehicle;
   - a seat suspended from said shock absorber;
   - a linkage providing a multi-degree of freedom connection between a bottom of said seat and said vehicle, to maintain stability of said seat; and
   - wherein said linkage comprises a trailing arm.

16. A shock absorbing seat according to claim 15 further comprising a shear pin connected between the seat and the roof or wall of the vehicle, the shear pin bearing a weight of the seat until failing, at which point the shock absorber bears the weight of the seat.

17. The shock absorbing seat of claim 15, wherein said trailing arm has a fixed length.

18. The shock absorbing seat of claim 17, wherein said trailing arm is pivotal in a vertical plane with respect to said vehicle.

19. The shock absorbing seat of claim 18, wherein said trailing arm is connected to said seat via a universal joint.

20. A vehicle seat comprising:
   a vertically disposed post having an upper end and a lower end, the upper end of said post having a bracket for mounting to a vehicle;
   a vertically disposed tube slidably engaged about said post;
   a passenger seat, mounted to said tube;
   a shock absorber, one end of said shock absorber being fixed to said post and the other end of said shock absorber being fixed to said tube;
   a trailing arm, one end of said trailing arm being pivotally connected to the lower end of said post, and the other end of said trailing arm for being pivotally connected to said vehicle; and
   wherein said shock absorber is disposed within said post and tube.

21. A vehicle seat according to claim 20 further comprising a shear pin connected between the passenger seat and the post, the shear pin bearing the weight of the seat until failing, at which point the shock absorber bears the weight of the seat.

22. A vehicle seat comprising:
   a vertically disposed post having an upper end and a lower end, the upper end of said post having a bracket for mounting to a vehicle;
   a vertically disposed tube slidably engaged about said post;
   a passenger seat, mounted to said tube;
   a shock absorber, one end of said shock absorber being fixed to said post and the other end of said shock absorber being fixed to said tube;
   a trailing arm, one end of said trailing arm being pivotally connected to the lower end of said post, and the other end of said trailing arm for being pivotally connected to said vehicle; and
   further comprising a fabric tether assembly to prevent rotation of said seat about said post, wherein a first end of said tether is pinned to a seat pan, and a second end of said tether is pinned to the trailing arm base.

23. A vehicle seat according to claim 22 further comprising a shear pin connected between the passenger seat and the post, the shear pin bearing the weight of the seat until failing, at which point the shock absorber bears the weight of the seat.

24. A vehicle seat comprising:
   a vertically disposed post having an upper end and a lower end, the upper end of said post having a bracket for mounting to a vehicle;
   a vertically disposed tube slidably engaged about said post;
   a passenger seat, mounted to said tube;
   shock absorber, one end of said shock absorber being fixed to said post and the other end of said shock absorber being fixed to said tube; and
   a trailing arm, one end of said trailing arm being pivotally connected to the lower end of said post, and the other end of said trailing arm being pivotally connected to said vehicle; and
   a shear pin fixed between said post and said tube, the shear pin bearing the weight of said passenger seat until failing, at which point the shock absorber bears the weight of said passenger seat.

25. A shock absorbing seat comprising:
   a shock absorber fixed to the roof or wall of a vehicle;
   a seat suspended from said shock absorber; and
   a linkage, pivotable in multiple dimensions, between the bottom of said seat and said vehicle, to maintain stability of said seat; and
   a shear pin fixed between said seat and said shock absorber, the shear pin bearing the weight of said passenger seat until failing, at which point the shock absorber bears the weight of said passenger seat.

* * * * *